United States Patent [19]

Sperman

[11] 3,981,546

[45] Sept. 21, 1976

[54] AIR BEARING CONSTRUCTION

[76] Inventor: Jacob H. Sperman, 2199 E. 21st St., Brooklyn, N.Y. 11229

[22] Filed: Sept. 29, 1969

[21] Appl. No.: 861,815

[52] U.S. Cl. .................................. 308/5 R; 308/9; 180/116; 180/125; 214/1 BE; 308/DIG. 1
[51] Int. Cl.² ........................................ F16C 17/00
[58] Field of Search ................... 308/9, 5, 240, 241, 308/DIG. 1; 214/1 BE; 180/116, 125; 302/29, 2 R, 37

[56] References Cited
UNITED STATES PATENTS

| | | | |
|---|---|---|---|
| 2,683,636 | 7/1954 | Wilcox | 308/DIG. 1 |
| 2,848,820 | 8/1958 | Wallin | 302/29 |
| 2,938,590 | 5/1960 | Barnett | 214/1 BE |
| 3,169,807 | 2/1965 | Abel et al. | 308/240 X |
| 3,376,083 | 4/1968 | Muijderman | 308/9 |
| 3,439,581 | 4/1969 | Wilkins | 308/5 |
| 3,513,934 | 5/1970 | Crowley | 214/1 BE |

FOREIGN PATENTS OR APPLICATIONS 177,370   3/1922   United Kingdom ................ 308/240

*Primary Examiner*—Charles J. Myhre
*Assistant Examiner*—R. H. Lazarus

[57] ABSTRACT

The disclosure describes a floating bearing consisting of a plate, desirably rectangular but of other possible shapes and forms, which has an internal passageway system permitting air under pressure to be fed into the plate at one side thereof and to be discharged along the upper or lower faces of the plate, depending upon the side which is to be supported. The bearing plate or pad upon the side which carries the discharge openings for the air which insures the floating effect are desirably provided with a series of grooves or recesses in random or linear formation desirably in circular form, on the discharge face, which will engage the flowing air or fluid and tend to retain it for a longer period than a flat face.

6 Claims, 3 Drawing Figures

AIR BEARING CONSTRUCTION

DESCRIPTION OF THE INVENTION

The present invention relates to an air bearing construction and it particularly relates to an air bearing construction which is designed to support fixtures and particularly heavy fixtures while work or processing is carried out thereon.

It is the primary object of the present invention to provide a simple air bearing plate or pad of the character described, which will have greatly increased effectiveness per pound of pressure or per unit volume of air passing therethrough to the bearing face.

Another object is to provide a novel air bearing pad or plate which will easily and readily support large heavy jigs and fixtures on machines and permit them to be readily shifted from place to place by relatively small manual effort, with increased effectiveness per pound of air and per unit volume of compressed air being supplied and utilized by the bearing pad or plate.

Another object of the present invention is to provide and air bearing, pad or plate which will have greatly enhanced effectiveness in supporting easily movable fixtures, such as gun cradles, and parts for armored vehicles, on tables of multi-spindle drilling machines, even though they may have relatively high masses, such as 1 to 2 tons.

A further object is to provide an air bearing plate which will have a relatively high rated capacity, even though supplied by relatively low shop airline pressures, for example of the order of 60 pounds per square inch.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

The present invention is particularly directed to the type of air bearing which will permit ready movement of jigs, fixtures, took and work bodies ranging from weights of 25 pounds to 10,000 pounds with a mere finger touch or push not exceeding ounces or pounds, as the case may be.

The bearing block with a normal shop air pressure may lift the object being worked upon by 0.001 to 0.004 inches, depending upon the weight and the air pressure, from a surface which may be a table carrying a tooling plate face, a cold rolled steel face, a Masonite face, without regard to any holes or T-slots that may be in such face.

The particular feature of the present invention consists in providing the bearing face with a plurality of grooves which desirably should close upon themselves and should not extend over the edge of the plate and which may be in the form of varying shaped and sized circles, elipses, or even, less preferably, polygonal shapes. Less preferably there may be long ridges or grooves which are joined at their ends so as to form a closed path on the face of the bearing face of the block or body, as the case may be.

It has been found that these arrangements of grooves, preferably extending in random fashion over the entire lower face of the bearing plate and desirably taking the form of circles, will break up the air pressure outflow pattern and will increase the lifting power up to 10 to 20% and desirably at least 5 to 7%.

These closed grooves or channels, which can be of very small size and which can be distributed in random or linear fashion completely over the bearing face, may have a depth of 0.00002 inches to 0.0002 inches, but preferably should range from 0.00005 inches to 0.0009 inches, and they desirably are semi-circular in cross-sectional area. The diameter of the circular grooves may vary from ⅛ inch up to 1 or 2 inches, but desirably should range from 3/16 of an inch to 1 inch, with air pressure outlet openings of 0.010 to 0.050 inches in diameter and desirably about 0.030 inches in diameter.

These dimensions are most satisfactory for air bearing plates which have sizes ranging from 6 inches by 6 inches to 6 inches by 10 inches to 6 inches by 20 inches. The preferred air pressure that should be applied may be from 5 to 150 pounds per square inch and desirably should be in the neighborhood of 40 to 100 pounds per square inch, with a preference for 60 pounds per square inch.

The largest circular grooves should have diameters of ¾ to 1 inch, while the smallest should have diameters from 1/16 to 1/32 of an inch. The plates themselves are desirably about 1⅛ inches in thickness, with central passages of about 5/16 of an inch in width and should be made of non-porous cast iron having about 3% carbon, although in special circumstances they may be made of other materials, such as aluminum steel, brass, stainless steel or specially formed plastics.

The internal passageways extend in and around the periphery of the plate and at intervals they are provided with openings in the side of the passageways that may have widths of about 1 to 4 inches and desirably about 3 inches, with radiuses of about 1 to 2 inches and desirably about 1½ inches. The passageways themselves are desirably spaced about ½ to ⅝ of an inch inside of the edges or outside faces of the plates, when the plates are about 1⅛ inches in thickness.

The air outlet opening which empty on one face are desirably spaced around the face adjacent the periphery and spaced inwardly by about ¾ to 1 inch and they have a small diameter of about 0.030 inches and they are spaced apart by about ¾ of an inch. These plates will have about 700 to 4,000 pounds lift, giving a lift actually of 0.001 to 0.005 inches, with air pressures ranging from 10 to 100 pounds per square inch and air flows of 6 to 25 cubic feet per minute. Depending upon the size of the objects, two, four, six or more of the plates may be put under large pieces of work, while with small pieces of work, usually one plate is satisfactory.

The faces of the air bearing plates or pads are ground flat and parallel within 0.0005 inches on opposite sides and with plates, for example of 6 by 6 inches. These may be as much as 16 orifices 0.030 inches in diameter spaced at regular intervals around the periphery inside of the outer edges. With larger plates, such as those measuring 6 to 10 inches, there may be as much as 30 of such orifices around the periphery of the plate.

In the preferred form of the invention, desirably the air bearing plate may have its discharge orifices facing downwardly against the table, with the work supported upon its top face, which is devoid of orifices. The flexible air hose is desirably attached to one side of the bearing plate and has a connection with the interior conduits. Frequently it is found desirable to feed a slight amount of oil through the bearing plate, together with the air to enhance the operation.

BRIEF DESCRIPTION OF DRAWINGS

With the foregoing and other objects in view, the invention consists of the noval construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Referring to FIGS. 1, 2 and 3, there is shown a plate A having the bearing side B to bear upon the support C and the top side D to carry the work E. This plate is desirably rectangular, as shown, but may take other shapes, such as circular, ovular or polygonal. The plate is interiorly provided with a cored rectangular passageway F having the inlet G extending to a flexible hose, not shown, and having the side recesses H, which permit additional receivers for the high pressure air.

The air will flow in through the inlets G under pressures varying from 5 to 150 pounds and desirably averaging 60 pounds, and will flow around the rectangular interior passageway F which is approximately equal in dimension in width to the thickness of the material S on the work side and J on the bearing side, as well as the side thicknesses K on the inlet side L on the opposite side and M and N on the long sides. The passageway feeds or supplies air under pressure to a series of vertical depending outlet bores Q.

Figure 1:
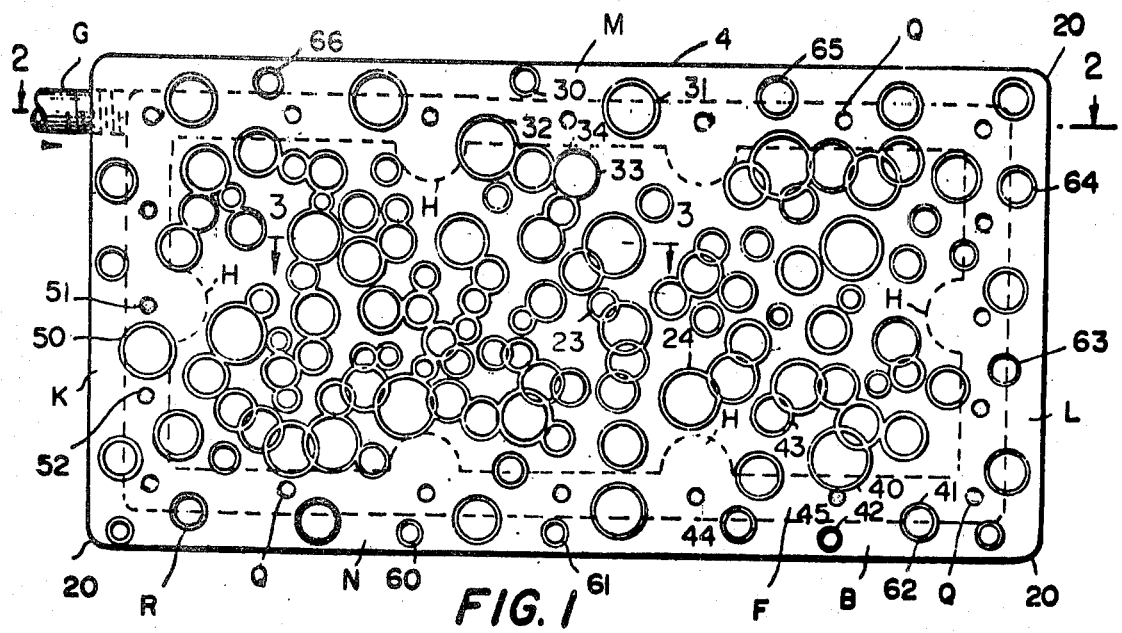
FIG. 1 is a bottom plan view of the preferred bearing plate of the present invention.
Figure 2:
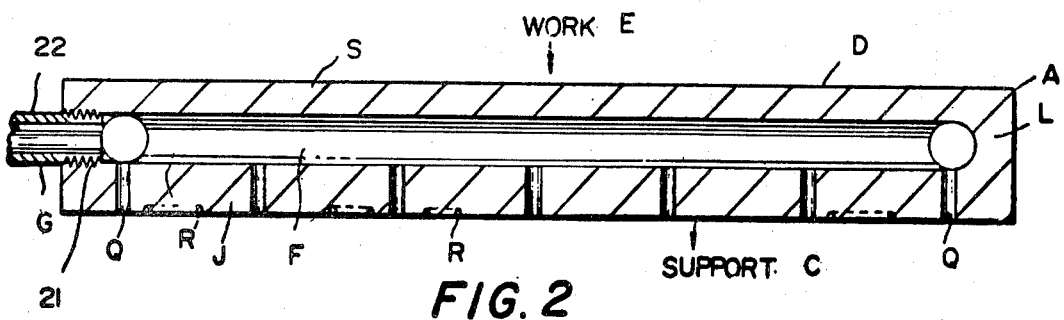
FIG. 2 is a transverse vertical sectional view upon the line 2—2 of FIG. 1.
Figure 3:
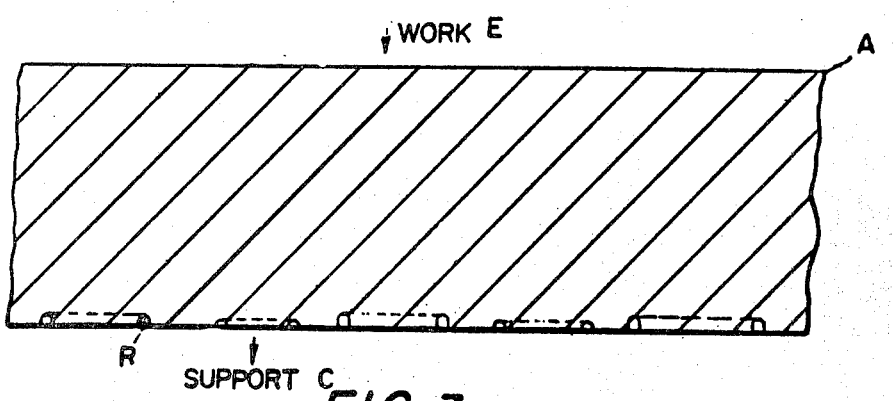
FIG. 3 is a transverse vertical sectional view upon the line 3—3 of FIG. 1, upon an enlarged scale as compared to FIG. 1.

The important feature of the present invention resides in the shallow, continuous grooves or recesses R which extend at random or linear fashion but substantially completely over the entire lower bearing face of support Face C of the plate A. The plate A may be of various sizes, ranging from 4 to 8 inches in width and 4 to 20 inches in length, and it is preferably rectangular, as shown in FIG. 1. The corners of the plate are desirably rounded, as indicated at 20, and formed within the plate, substantially closer to the work faces E than to the bearing face C, is the rectangular passageway F.

The rectangular passageway F has a diameter or width of about ⅓ to ½ of the thickness of the plate A, and it extends closely adjacent the edges of the plate A by a distance equal to about the diameter or width of the passageway. At one corner of the passageway there is desirably a tapped opening 21, which receives a threaded copper tube 22, which is in turn connected to a flexible hose, not shown, for feeding air of fluid under pressure to the interior passageway F.

This interior passageway F is provided on it inner face, as shown best at H in FIG. 1, with a series of recesses which have a depth of about ½ or equal to the width of the passage F and are desirably semi-circular, as best indicated in FIG. 1. These will equalize the flow of high pressure air to the passageway openings Q, which are positioned at each corner of the passageway F and also are equally spaced along each side of the block A. These passageways have a diameter about 0.010 to 0.050, preferably 0.030 inches and they should be countersunk or enlarged at or adjacent the support face C to better control the air flow.

The closed end recesses or grooves R are very shallow and are of varying size, ranging from small circles, such as 23 in FIG. 1, to relatively large circles, as indicated at 24 in FIG. 1, and they will receive, hold and distribute the high pressure or flow, through the outlet ducts or bores Q onto and over the support face C. They have a depth that may vary from 0.00001 to 0.0009 inches over the entire support face C and they will break up and retain the high pressure air and use it to much greater efficiency, with the result that the effect of support will be enhanced by as much as 20 or 25% and at least by 5 to 7%.

It is, of course, possible to use ovals or other closed end passageways, but it has been found most satisfactory to have the deflecting passageway as compact as possible, which is most readily possible with circular grooves, as indicated at R. It has been found that the various pressure outlets Q may well be encircled by a group of two to five of these surface grooves, such as indicated for example by the encircling group 30, 31, 32 and 33 around the outlet 34, or 40, 41, 42, 43 and 44 around the outlet 45.

A few of these circular grooves may also be placed directly between the outlet pressure openings, such as indicated by the groove 50 between the outlet bores 51 and 52. A number of smaller grooves may be placed in the margin between the outlet passageways Q and the edge of the block, as indicated at 60, 61, 62, 63, 64, 65 and 66.

It is thus apparent that the applicant has provided a way of increasing the efficiency and effectiveness of air bearing blocks, particularly in that the same pressure of air can be utilized to achieve a greatly enhanced effect.

As many changes could be made in the above air bearing construction, and many widely different embodiments of this invention could be made without departure from the scope of the claims, it is intended that all matter contained in the above description shall be interpreted as illustrative and not in a limiting sense.

Having now particularly described and ascertained the nature of the invention, and in what manner the same is to be performed, what is claimed is:

1. A fluid bearing for supporting a load for movement in a plane substantially parallel to the plate comprising a rigid load supporting plate having substantially parallel upper and lower faces, one of said faces forming a surface for a load to be supported and the other of said faces forming a bearing surface, an internal fluid conduit system intermediate said upper and lower faces, a plurality of spaced outlet orifices extending vertically transversely through the plate between the internal conduit system and the bearing face and a plurality of fluid retaining grooves on said bearing face forming closed ended fluid paths in said bearing surface for receiving a portion of the fluid discharged from said orifices and for restraining the flow of such discharged fluid along said bearing surface. The fluid to be Air or Gas continuously supplied under pressure thru an inlet.

2. The construction of claim 1, said grooves being randomly positioned over the entire bearing face of said plate.

3. The construction of claim 1, said grooves consisting of closed passages which have much less cross-sectional area than the orifices and extending primarily between and within the space covered by the orifices.

4. The construction of claim 1, said orifices being arranged around the periphery of the bearing face of the plate and said grooves being arranged interiorly of and exteriorly of said orifices upon said bearing face. Said orifices to have an inside diameter of 0.010 to 0.050 of an inch.

5. The construction of claim 1, said grooves consisting of a plurality of circles of varying diameter.

6. The construction of claim 1, said grooves having a cross-sectional area about 1/10 to 1/100 of the cross-sectional area of said orifices. Said grooves to have a depth not less than 0.00005 inches and not deeper than 0.0009 inches.

* * * * *